United States Patent
Willis

(10) Patent No.: US 7,271,817 B2
(45) Date of Patent: Sep. 18, 2007

(54) ASPECT RATIO CONVERSION FOR IMAGERS HAVING RANDOM ROW ACCESS

(75) Inventor: Donald Henry Willis, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 178 days.

(21) Appl. No.: 10/099,006

(22) Filed: Mar. 14, 2002

(65) Prior Publication Data

US 2002/0167476 A1 Nov. 14, 2002

Related U.S. Application Data

(60) Provisional application No. 60/290,539, filed on May 11, 2001.

(51) Int. Cl.
*G09G 5/02* (2006.01)

(52) U.S. Cl. .............. 345/698; 345/699; 345/204; 345/212

(58) Field of Classification Search ........ 345/690–699, 345/204–215; 348/441–449, 459, 555–558, 348/581, 207, 222, 248, 312
See application file for complete search history.

(56) References Cited

U.S. PATENT DOCUMENTS

| | | | | |
|---|---|---|---|---|
| 5,034,981 A | * | 7/1991 | Leonard et al. | 380/204 |
| 5,914,755 A | * | 6/1999 | Ito et al. | 348/552 |
| 6,002,446 A | | 12/1999 | Eglit | |
| 6,064,437 A | * | 5/2000 | Phan et al. | 348/446 |
| 6,160,578 A | * | 12/2000 | Carroll et al. | 348/222.1 |
| 6,549,240 B1 | * | 4/2003 | Reitmeier | 348/459 |
| 6,675,384 B1 | * | 1/2004 | Block et al. | 725/28 |
| 6,683,655 B2 | * | 1/2004 | Han | 348/581 |
| 2002/0039137 A1 | * | 4/2002 | Harper et al. | 348/207 |

FOREIGN PATENT DOCUMENTS

| | | |
|---|---|---|
| JP | 7-005845 | 1/1995 |
| JP | 9009180 | 1/1995 |
| JP | 9307839 | 11/1997 |
| JP | 10-334227 | 12/1998 |

\* cited by examiner

*Primary Examiner*—Vijay Shankar
(74) *Attorney, Agent, or Firm*—Joseph J. Laks; Harvey D. Fried

(57) ABSTRACT

A method (400) of aspect ratio conversion for an imager (16) having random row access includes the steps of periodically receiving (402) a predetermined number of input video lines, vertical format converting (404) the predetermined number of input video lines to provide a converted video input having a portion of the predetermined number of input video lines, and periodically multiplexing (406) a black input line with the converted video input during a waiting period during the vertical format converting step. The method can also include the step of presenting (408) on the imager the converted video input along with a plurality of black lines that were periodically multiplexed with the converted video input.

17 Claims, 3 Drawing Sheets

302 — CONVERT AN INPUT VIDEO IMAGE HAVING A FIRST PREDETERMINED NUMBER OF VERTICAL LINES TO AN OUTPUT VIDEO IMAGE HAVING A SECOND PREDETERMINED NUMBER OF VERTICAL LINES

304 — PERIODICALLY MULTIPLEX THE OUTPUT VIDEO IMAGE WITH A BLACK LINE INPUT SIGNAL DURING A DELAY PERIOD DURING THE CONVERTING STEP TO PROVIDE A MODIFIED OUTPUT IMAGE HAVING A PLURALITY OF BLACK LINES

306 — PRESENT THE MODIFIED OUTPUT IMAGE ON THE IMAGER

ASPECT RATIO CONVERSION FOR IMAGERS HAVING RANDOM ROW ACCESS

CROSS REFERENCE TO RELATED APPLICATIONS

This is a non-provisional application of provisional application Ser. No. 60/290,539 filed May 11, 2001.

BACKGROUND OF THE INVENTION

1. Field of the Invention

This invention relates to the field of projection television receivers and displays in general, and in particular, to projection television receivers and displays utilizing imagers having random row access, for example liquid crystal on silicon (LCOS) imagers.

2. Description of Related Art

A liquid crystal imager, for example an LCOS imager, can have an aspect ratio of 4:3, in accordance with standard television receivers. However, such a receiver must also be capable of displaying a video program having a wide screen aspect ratio of 16:9. A 16×9 video program can be displayed on a 4:3 display, using a 4:3 LCOS imager, by performing a vertical format conversion which converts the 16:9 image to fit into three fourths (¾) the height of the 4:3 display.

An aspect ratio conversion to show a 16:9 program with a 4:3 imager might require, for example, converting a 1080 line image into an 810 line image. In order to do this, the typical vertical format converter will wait two line periods until two lines are present and will then use the two lines to generate one output line. This output will occur during one line period of the input signal. Next, the converter will use a third input line, along with the input lines already received, to generate a second output line during the next input line period. After that, the converter will use a fourth input line to generate a third output line. At this point, the converter must wait for another input line to be entirely read in, in order to continue. This wait or delay is a whole input line period caused by the vertical format converter performing a recalculation of the pixels for each line. Thus the converter, in reducing the number of lines, has naturally occurring dead line periods in its output during which no data is sent out to the imager.

Normally, this function requires a substantial memory capacity, for example one fourth (¼) of a frame, as well as sufficient memory bandwidth to write the frames in a normal frame period and read the output frames in three fourths (¾) of the normal frame period. There is always a need in developing video display systems to reduce memory requirements and bandwidth, so that circuits can be simplified and costs can be reduced.

SUMMARY OF THE INVENTION

Memory capacity and bandwidth can be advantageously reduced by utilizing random row access in an imager such as a liquid crystal imager and by taking advantage of the dead times in the aspect ratio conversion process, such that during each of the dead times a black line is sent to the upper or lower portion of the display, thus framing for example a 16:9 wide screen aspect ratio picture within a 4:3 liquid crystal imager. The wide screen picture will be as wide horizontally as the imager but not as vertically high as the imager. The nature of a liquid crystal imager, particularly a normally white LCOS imager, is that unused pixels cannot simply be left blank or empty, but must be driven to the blackest black level possible. The inventive arrangements make it possible to populate the unused rows of the imager at the black level and the active rows of the imager resulting from the format conversion to be populated within the same time interval needed to convert each field without the use of an unnecessarily large memory.

In a first aspect of the invention, an aspect ratio conversion system for an imager comprises a vertical format converter for converting an input image having a first predetermined number of lines to an output image having a second predetermined number of lines, means for inserting a black line in the output image during a waiting period of the vertical format converter, and means for random row access in the imager for presenting the output image with a plurality of black lines and a plurality of active lines.

In a second aspect of the present invention, an aspect ratio conversion system for an imager having random row access comprises a vertical format converter for converting an input image having a predetermined aspect ratio to an output image formed on a portion of a total number of lines of the imager and means for inserting a black line to a remaining portion of the total number of lines of the imager during a waiting period of the vertical format converter.

In a third aspect of the present invention, a method of aspect ratio conversion for a liquid crystal imager comprises the steps of converting an input video image having a first predetermined number of vertical lines to an output video image having a second predetermined number of vertical lines, periodically multiplexing the output video image with a black line input signal during a delay period during the converting step to provide a modified output image having a plurality of black lines, and presenting the modified output image on the liquid crystal imager.

In a fourth aspect of the present invention, a method of aspect ratio conversion for an imager having random row access comprises the steps of periodically receiving a predetermined number of input video lines, vertical format converting the predetermined number of input video lines to provide a converted video input having a portion of the predetermined number of input video lines, and periodically multiplexing a black input line with the converted video input during a waiting period during the vertical format converting step.

BRIEF DESCRIPTION OF THE DRAWINGS

FIG. 3 is a flow chart illustrating a method of aspect ratio conversion in accordance with the present invention.

DETAILED DESCRIPTION OF THE PREFERRED EMBODIMENTS

Figure 1:
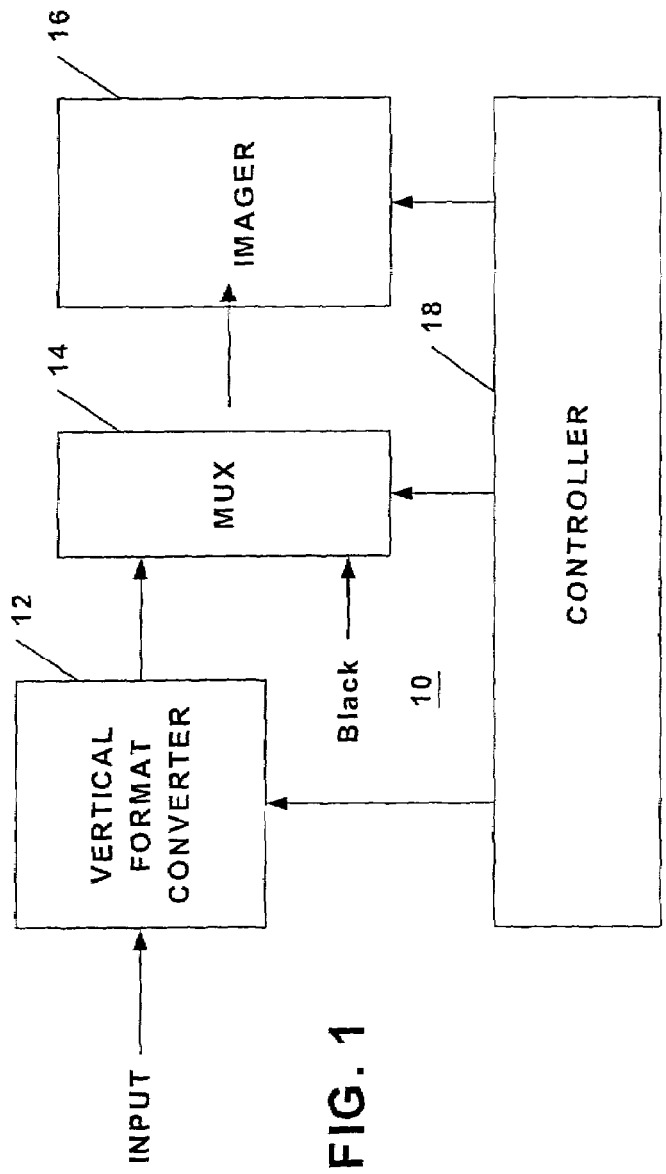
FIG. 1 is a block diagram of a video processing circuit in accordance with the inventive arrangements.

Although the present invention is applicable to various aspect ratio conversions, the illustrations herein relate to a conversion of a 16:9 program to be shown on a 4:3 imager. Assume that an aspect ratio conversion to show the 16:9 program using the 4:3 imager requires, for example, converting a 1080 line image into an 810 line image. With reference to the video display system 10 shown in FIG. 1, a vertical format converter 12 has as an input the 16:9 video signal. As noted, the vertical format converter will wait one line period until two lines are available and will then use the two lines to generate an output line. Preferably, the "waiting" is achieved using a line memory that reads out a sequence of pixels of a first line as a second sequence of pixels of a second line is written into the line memory. This output will occur during one line period of the input signal. Next, the converter will use a third line received as an input, along with the input lines already received, to generate a second output line during the next input line period. After that, the converter will use a fourth line received as an input to generate a third output line. At this point, the converter must wait for another input line to be entirely read in, in order to continue. This wait is a whole input line period.

During this waiting period a black line can be written out to the display in accordance with the inventive arrangements. In order to accomplish this in accordance with the inventive arrangements, the output of the vertical format converter 12 can be a first input to a multiplexer 14. The other input can be a black level pixel value used to drive at least one or more lines to black in accordance with the present invention. The multiplexer supplies the converted video lines to an imager 16 such as a liquid crystal imager or an LCOS imager as shown, whenever they are available from a memory in the vertical format converter 12 for example. However, during each waiting line period of the vertical format converter, the multiplexer supplies the black level pixel values to the imager 16. The cycle repeats until the image is fully loaded with picture data and black lines. In this way, 810 useful image lines are advantageously generated along with 270 black lines (135 black lines on a top portion of the imager and 135 black line on a bottom portion of the imager for example. If the original imager had 1080 rows in it, this is the correct number of black lines if they can be properly placed in the top and bottom regions of the display. This can be done if the LCOS imagers have random row access.

Figure 2:
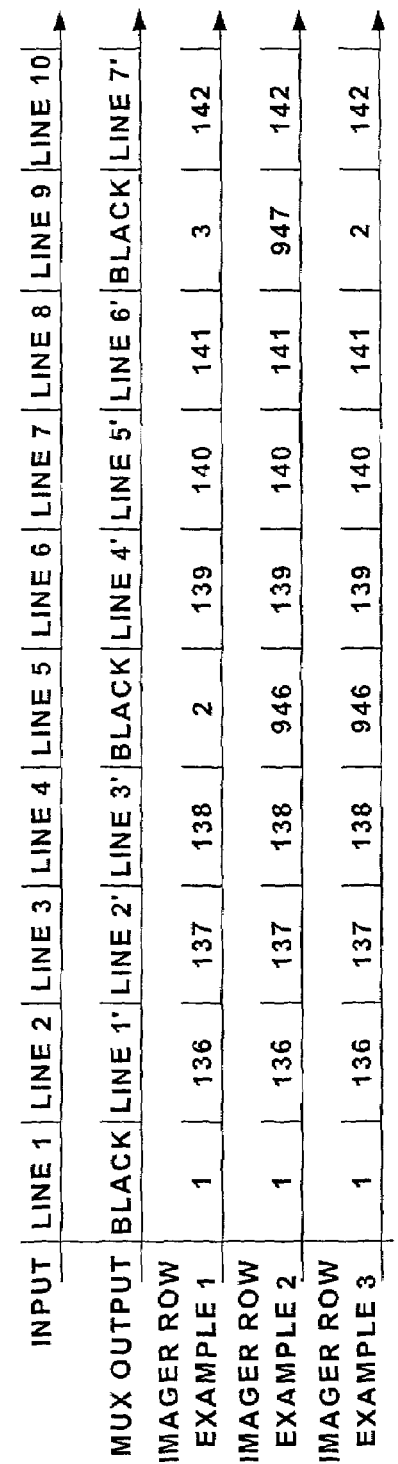
FIG. 2 is a timing diagram useful for explaining the inventive arrangements and the operation of the block diagram in FIG. 1 in accordance with the inventive arrangements.

A timing diagram is shown in FIG. 2. Two alternative examples are demonstrated. When the first line of the input signal is being read in, the multiplexer output can be read from the black level input to row 1 of the imager in all examples shown. The first four lines are then processed into converted lines 1'-3' that are supplied to rows 136-138 of the imager. The next waiting period occurs while line five is read into the vertical format converter. During this time, a black line can be supplied to row 2 of the imager in accordance with example 1 or can be supplied to row 946 in accordance with example 2 or example 3. Thereafter, input lines 5-7 are processed into converted lines 4'-6' and supplied to image rows 139-141. During the waiting period while input line 9 is read into the vertical format converter, a black line can be read into row 3 of the imager in accordance with example 1 or can be read into row 947 of the imager in accordance with example 2 or can be read into row 2 of the imager in accordance with example 3. As can be seen, example 1 fills in the upper black bar before the lower black bar, whereas example 2 and example 3 fills in each black bar at the same time, in an alternating manner. It should be noted that example 3 may not be suitable for all imagers such as LCOS displays due to fringing field or sparkle problems resulting from adjacent negative and positive fields that may be written to the top or bottom lines.

The operation of the vertical format converter, the multiplexer and the imager can be controlled by clock and synchronizing circuits (not shown) in a controller 18.

Referring to FIG. 3, a flow chart illustrating a method 300 of aspect ratio conversion for a liquid crystal imager is shown. As previously explained, an image having a 16:9 aspect ratio can be converted to fit a portion of the total number of lines of the liquid crystal imager. Preferably, the method comprises the step 302 of converting an input video image having a first predetermined number of vertical lines to an output video image having a second predetermined number of vertical lines. Then at step 304, the method multiplexes the output video image with a black line input signal during a delay period during the converting step 302 to provide a modified output image having a plurality of black lines. The black lines can be inserted so that a top portion of the imager forms an upper black bar and then a bottom portion of the imager forms a lower black bar. Alternatively, the insertion of black lines can occur in an alternating fashion (spatially) so that the upper and lower black bars are filled at roughly the same time. At step 306, the modified output image is presented on the liquid crystal imager. It should also be understood within contemplation of the present invention that the black lines could be inserted all on the top or all on the bottom or in a proportion divided between the top and bottom as desired.

Figure 4:
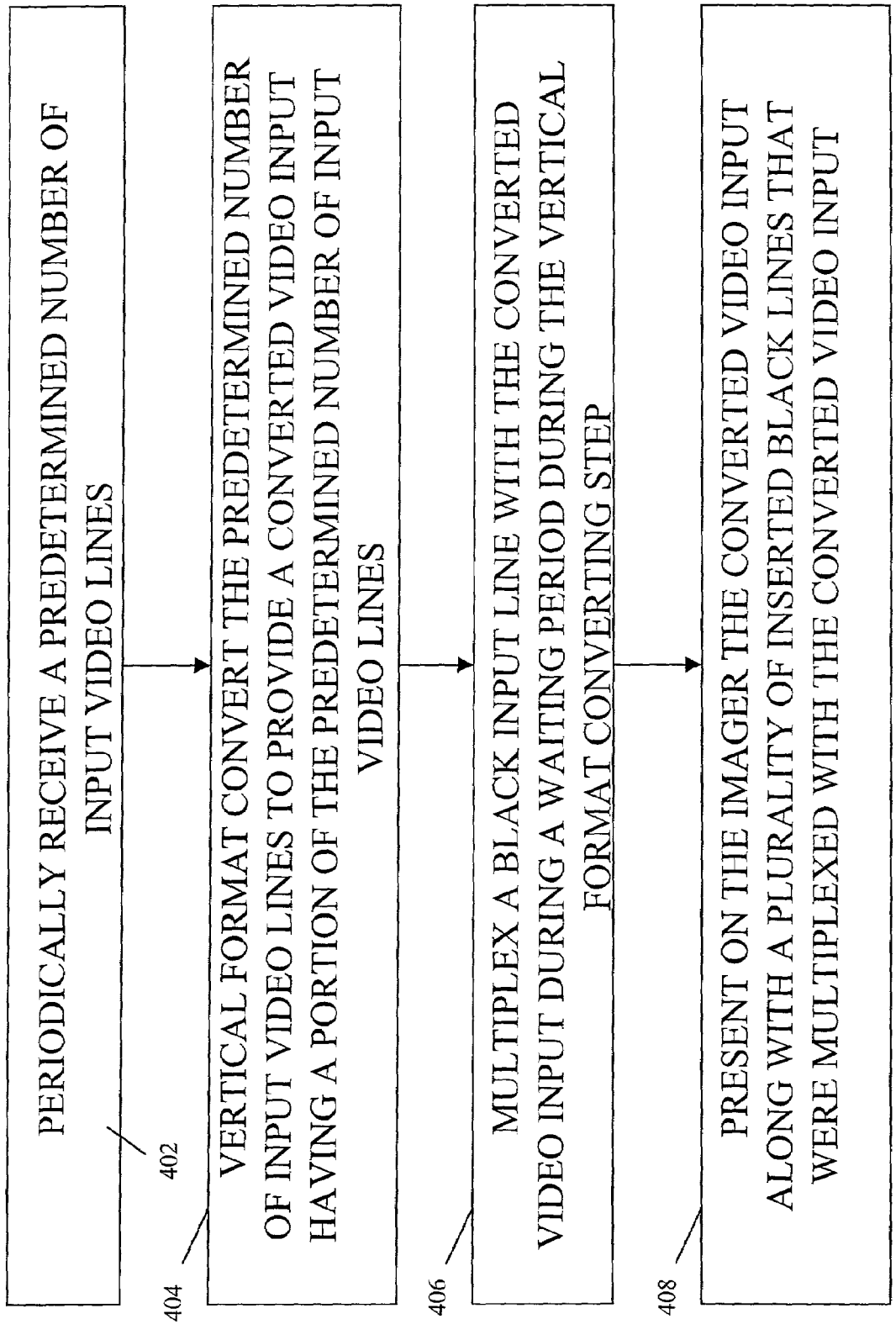
FIG. 4 is a flow chart illustrating another method of aspect ratio conversion in accordance with the present invention.

Referring to FIG. 4, another flow chart illustrating another method 400 of aspect ratio conversion for an imager having random row access is shown. The method 400 preferably comprises the step 402 of periodically receiving a predetermined number of input video lines, then vertical format converting at step 404 the predetermined number of input video lines to provide a converted video input having a portion of the predetermined number of input video lines. At step 406, the method would then multiplex a black input line with the converted video input during a waiting period during the vertical format converting step. The method 400 can then further include the step 408 of presenting on the imager the converted video input along with a plurality of black lines that were multiplexed with the converted video input.

Although the present invention has been described in conjunction with the embodiments disclosed herein, it should be understood that the foregoing description is intended to illustrate and not limit the scope of the invention as defined by the claims.

What is claimed is:

1. An aspect ratio conversion system for an imager, comprising:
   a vertical format converter for converting an input image having a first predetermined number of lines to an output image having a second predetermined number of lines;
   a multiplexer responsive to the output image and to a black line input signal for inserting black lines in the output image during a waiting period of the vertical format converter;
   a controller programmed to insert the black lines during the waiting period, the multiplexer and the vertical format converter being controlled by the controller; and,
   means for random row access in the imager for presenting the output image with a plurality of black lines.

2. The system of claim 1, wherein the imager is selected from the group of imagers including liquid crystal on silicon (LCOS), plasma, micro-mirrors, liquid crystal display, and transmissive liquid crystal display projection.

3. The system of claim 1, wherein the first predetermined number of lines is 1080 and the second predetermined number of lines is 810.

4. The system of claim 1, wherein the first predetermined number of lines is 480 and the second predetermined number is 360.

5. The system of claim 1, wherein the aspect ratio conversion converts a 16:9 image to fit into three-fourths (¾) the height of a 4:3 display.

6. The system of claim 1, wherein the means for inserting black lines inserts black lines on a top portion of the imager to form an upper black bar and then inserts black lines on a bottom portion of the imager to form a lower black bar.

7. The system of claim 1, wherein the means for inserting black lines inserts black lines on a top portion of the imager and then inserts black lines on a bottom portion of the imager in an alternating manner to form an upper black bar and a lower black bar.

8. An aspect ratio conversion system for an imager having random row access. Comprising:
    a vertical format converter for converting an input image having a predetermined aspect ratio to an output image formed on a portion of a total number of lines of the imager; and
    means for inserting a black line to a remaining portion of the total number of lines of the imager during a waiting period of the vertical format converter.

9. The system of claim 8, wherein the aspect ratio conversion converts a 16:9 image to fit into three-fourths (¾) the height of a 4:3 display.

10. The system of claim 8, wherein the means for inserting the black line inserts black lines on a top portion of the imager to form an upper black bar and then inserts black lines on a bottom portion of the imager to form a lower black bar.

11. The system of claim 8, wherein the means for inserting the black line inserts black lines on a top portion of the imager and then inserts black lines on a bottom portion of the imager in an alternating manner to form an upper black bar and a lower black bar.

12. A method of aspect ratio conversion for a liquid crystal imager having random row access, comprising the steps of:
    convening an input video image having a first predetermined number of vertical lines to an output video image having a second predetermined number of vertical lines;
    multiplexing the output video image with a black line input signal during a delay period during the converting step to provide a modified output image having a plurality of black lines; and
    presenting the modified output image on the liquid crystal imager.

13. The method of claim 12, wherein the step of converting comprises converting an image having a 16:9 aspect ratio to fit a portion of the total number of lines of the liquid crystal imager.

14. The method of claim 12, wherein the step of inserting the black line inserts black lines on a top portion of the imager to form an upper black bar and then inserts black lines on a bottom portion of the imager to form a lower black bar.

15. The method of claim 12, wherein the step of inserting the black line inserts black lines on a top portion of the imager and then inserts black lines on a bottom portion of the imager in an alternating manner to form an upper black bar and a lower black bar.

16. A method of aspect ratio conversion for an imager having random row access, comprising the steps of:
    periodically receiving a predetermined number of input video lines:
    vertical format converting the predetermined number of input video lines to provide a converted video input having a portion of the predetermined number of input video lines;
    multiplexing a black input line with the converted video input during a waiting period during the vertical format converting step.

17. The method of claim 16, wherein the method further comprises the step of presenting on the imager the converted video input along with a plurality of black lines that were multiplexed with the convened video input.

* * * * *